United States Patent [19]

Elms et al.

[11] Patent Number: 4,940,391
[45] Date of Patent: Jul. 10, 1990

[54] COMPRESSOR SURGE DETECTION SYSTEM

[75] Inventors: Robert T. Elms, Monroeville Boro; Clyde O. Peterson, Plum Boro; Gary F. Saletta, Penn Township, Westmoreland County, all of Pa.

[73] Assignee: Westinghouse Electric Corp., Pittsburgh, Pa.

[21] Appl. No.: 268,102

[22] Filed: Nov. 7, 1988

[51] Int. Cl.$^5$ ............................................ F04B 49/00
[52] U.S. Cl. ...................................... 417/12; 417/26; 417/27; 417/280
[58] Field of Search .................. 417/12, 26, 27, 44, 417/45, 280; 62/228.1

[56] References Cited

U.S. PATENT DOCUMENTS

| | | | |
|---|---|---|---|
| 3,380,650 | 4/1968 | Drummond et al. | |
| 3,778,695 | 12/1973 | Bauer, Jr. | 318/481 |
| 4,519,748 | 5/1985 | Murphy et al. | 417/45 |
| 4,546,618 | 10/1985 | Kountz et al. | 417/20 |
| 4,581,900 | 4/1986 | Lowe et al. | 415/17 |
| 4,616,483 | 10/1986 | Leonard | 417/280 |
| 4,686,834 | 8/1987 | Haley et al. | 62/228.1 |

OTHER PUBLICATIONS

Gregory K. McMillan, Centrifugal and Axial Compressor Control, pp. 57-72 (Section 6, Surge Control), Published by the Instrument Society of America, Aug. 1983.

Primary Examiner—Donald E. Stout
Attorney, Agent, or Firm—C. M. Lorin

[57] ABSTRACT

In a compressor system, surge detection is provided by sensing the current of the motor driving the compressor and reading oscillations of the current about the average thereof and above and below two opposite threshold levels from such average current and counting the polarity changes within a time interval containing so many samples of the current and defining a sliding window.

4 Claims, 12 Drawing Sheets

COMPRESSOR SURGE DETECTION SYSTEM

BACKGROUND OF THE INVENTION

The invention relates in general to compressor control, and more particularly to the prevention of the consequences of "surging" in such compressor control. "Surging" is a phenomenon caused by the compressor operating below a given amount of horse power or gas volume and the resulting occurrence of nonsteady state condition compounded by erratic control and an uncontrolled output.

The problem of surging and the prevention thereof have been explained in "Centrifugal and Axial Compressor Control by Gregory K. McMillan (The Instrument Society of America, 67 Alexander Drive, P.O. Box 12277, Research Triangle Park, NC 27709), 1983.

The present invention aims at an early detection of the occurrence of a surge, thereby providing an immediate opportunity of preventing the consequence thereof. Therefore, the invention distinguishes itself from the prior art methods by preventing the consequences of a surge by the timely and accurate detection of an occurring surge.

The invention is based on the magnitude of the current of the motor driving the compressor at the critical moment. The prior art has recognized the relationship existing between the volume of the compressed gas, or the pressure of the compressor, to the energy of the motor in operation, or its current. However, the object, there, has been to control the compressor as a function of the sensed current in order to prevent a surge, not to detect the imminence of a surge, or in order to control the compressor in relation to the gas volume while observing the surge limit. See, for instance, U.S. Pat. Nos. 3,778,695; 4,519,748 and 3,380,650, and also: "Surge Control For Multistage Centrifugal Compressors" by David F. Baker in Chemical Engineering May 31, 1982, pp. 117-122; "Improved Surge Control for Centrifugal Compressors" by N. Staroselsky and L. Ladin in Chemical Engineering May 21, 1979, pp. 175-184; and "Surge Control for Centrifugal Compressors" in Chemical Engineering Dec. 25, 1972, pp. 54-62.

SUMMARY OF THE INVENTION

The invention provides for the detection of the imminence of a surge in a motor driven compressor by sampling the motor current within a predetermined time interval and counting the occurrence of a predetermined minimum number of changes of polarity of the derived samples within such time interval.

Such changes of polarity represent sharp deviations of the motor current in opposite directions from normal operation current magnitude, these deviations being due to motor loading behavior with the compressor and manifesting themselves as a result of a cyclical change of operation by the motor between motoring and regenerating modes, upon the occurrence of a surge. More specifically, such deviations are measured by reference to the average current as sensed under normal operation and they are converted into an error condition when beyond a predetermined minimum deviation used as a threshold. The average current used as a reference is obtained by sampling the actual current and averaging the samples through a sliding window. Each error condition indicative of the threshold being exceeded is stored with an indication of its polarity. Changes of polarity are counted through a predetermined time interval as an indication of a surge condition. Protective measures are immediately triggered within the compressor system upon the detection of a surge condition.

DESCRIPTION OF THE INVENTION

Figure 1:
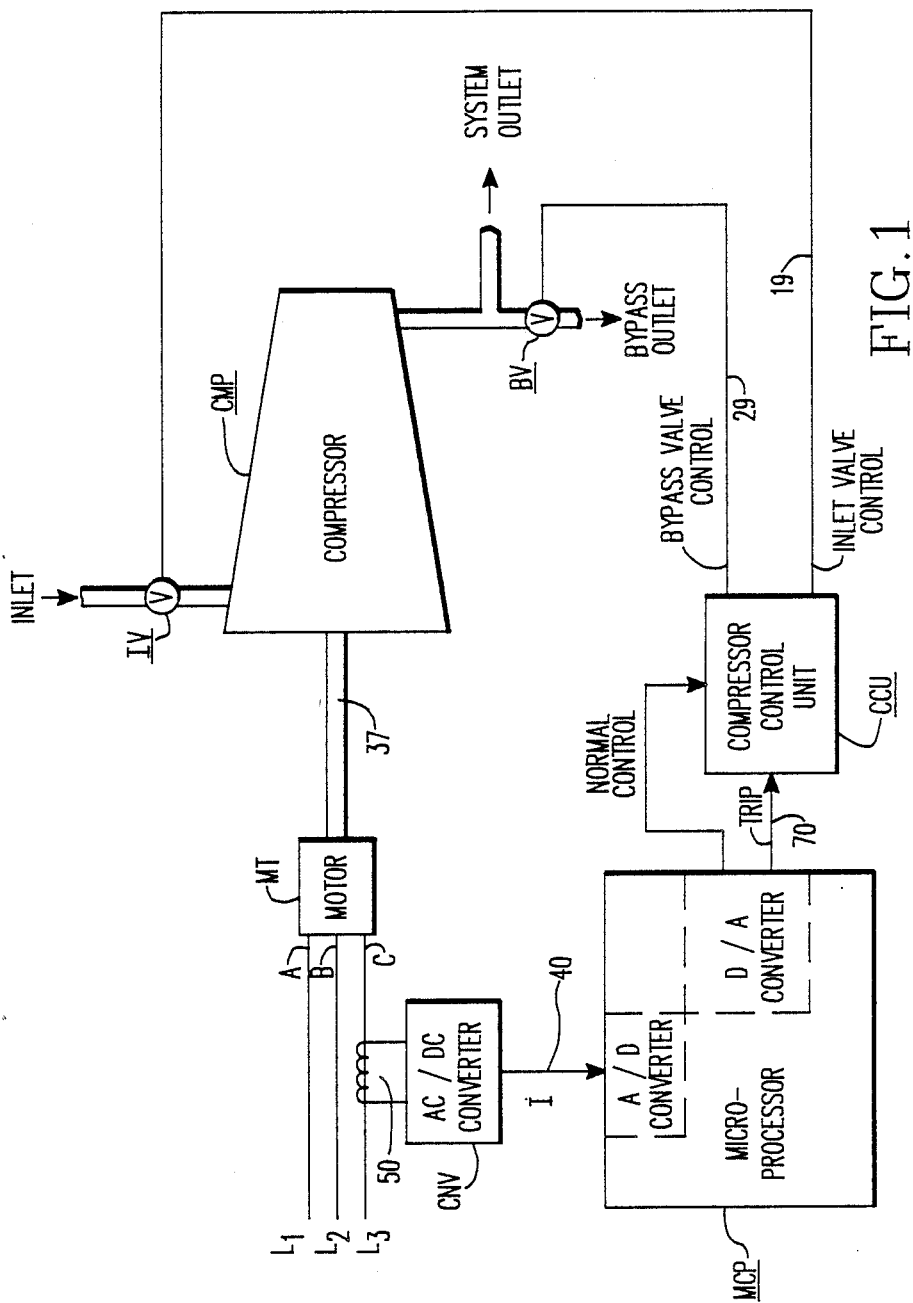
FIG. 1 is a block diagram of the compressor control system according to the present invention.

Referring to FIG. 1, a compressor CMP is shown connected between the duct from the inlet and the duct to the outlet for a system using pressurized fluid. There is a separate duct having a normally closed valve BV used in an emergency to blowoff the outlet pressure and override the load for protection. The inlet valve IV is placed at the inlet to control the incoming fluid, especially during startup. The compressor is driven by an electric motor, typically an AC motor supplied on three phases, A,B,C from the AC power lines L1,L2,L3 through a contactor CNT. The system is controlled by a unit MCP including a computer, for instance a microcomputer, associated with digital circuitry including A/D and D/A converters interfaced with analog inputs and outputs, respectively. According to the present invention, motor current is sensed (from lines 50) and, after rectification and filtering (within block CNV), a signal representative of the rms of the current I of the motor is derived on line 40. This signal is inputted into the computer control unit MCP, from which is obtained an emergency trip signal on line 70 to a compressor control unit CCU in case alternate polarity changes in sufficient number have been detected, thereby denoting the occurrence of a surge. In response to such trip signal the compressor control unit will, by line 19, provide control for closing of the inlet valve IV and, by line 29, transmit a command to open the bypass valve BV. Control of the valves per se, when required, are well known in the compressor control field. They are controlled from the MCP unit, under normal control of the compressor unit CCU generally known, for instance for startup, pressure regulation, or merely to stop the overall operation.

Figure 2:
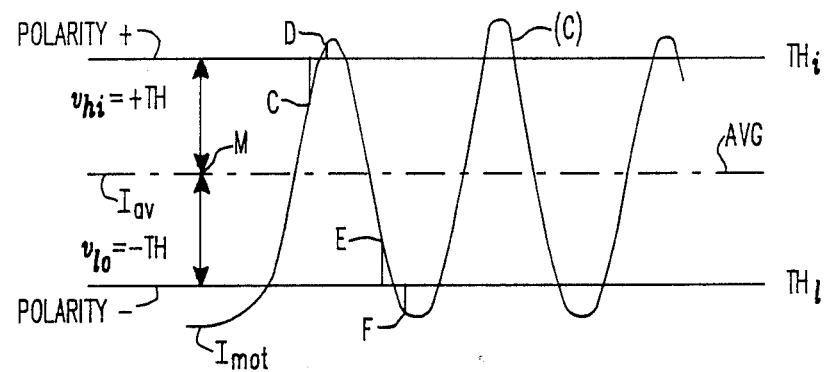
FIG. 2 is a graphic representation of the occurrence of a surge translated into polarity changes about two reference levels encompassing the average motor current, and as detected according to the present invention.

Referring to FIG. 2, the occurrence of a surge is characterized by the motor current Imot erratically and cyclically oscillating between extreme values, up and down, as shown by curve (C). The gist of the present invention is to detect such oscillation and recognize a surge when oscillations occur a predetermined number of times. As explained hereinafter, high and low thresholds THi and THl are established above and below a normal operation representative signal selected to be the average current Iav occurring during a predetermined period, the latter chosen illustratively to be 4 seconds. When there is an oscillation, such threshold levels are exceeded (as shown between CD for the upper one, and EF for the lower one), alternatively one way and the other, and so many times. Indeed, should the value exceed one threshold more than once without encountering the opposite threshold, there would be no change of polarity, and therefore no count of an oscillation will take place. Imot (the sensed instantaneous value of the current), Iav (the average current for the period), THi (the higher threshold) and THl (the lower threshold) are determined within block MCP from the value of the current sensed and derived on line 40 of FIG. 1. Illustratively, the thresholds THi and THl are at equal distance above and below line AVG or ordinate Iav, by an amount of $+TH$ and $-TH$ (represented in analog terms by voltages vhi and $-$vlo in FIGS. 7A to 7E as explained hereinafter). The current is sampled and N successive samples are held through a sliding window, the samples therein being on the basis of the well known "first in and last out" method. See for instance: U.S. Pat. Nos. 4,463,432 and 4,229,795. For the purpose of describing how a sliding window is implemented, these two patents are hereby incorporated by reference. Illustratively, it is assumed that 40 samples are collected within a period of 4 seconds, i.e. at a rate of 10 samples per second. When, within such predetermined time interval, so many alternative changes of polarity have been taking place (N* being the critical count in the illustration of FIGS. 3 and 4, hereinafter), the conclusion is that a surge is occurring and that measures have to be taken immediately in order to prevent undesirable consequences for the compressor. Commands for these measures are illustratively shown in FIG. 1 to be control for closing of the inlet valve IV, by line 19, and for opening of the bypass valve BV, by line 29, as generally known.

Figure 3:
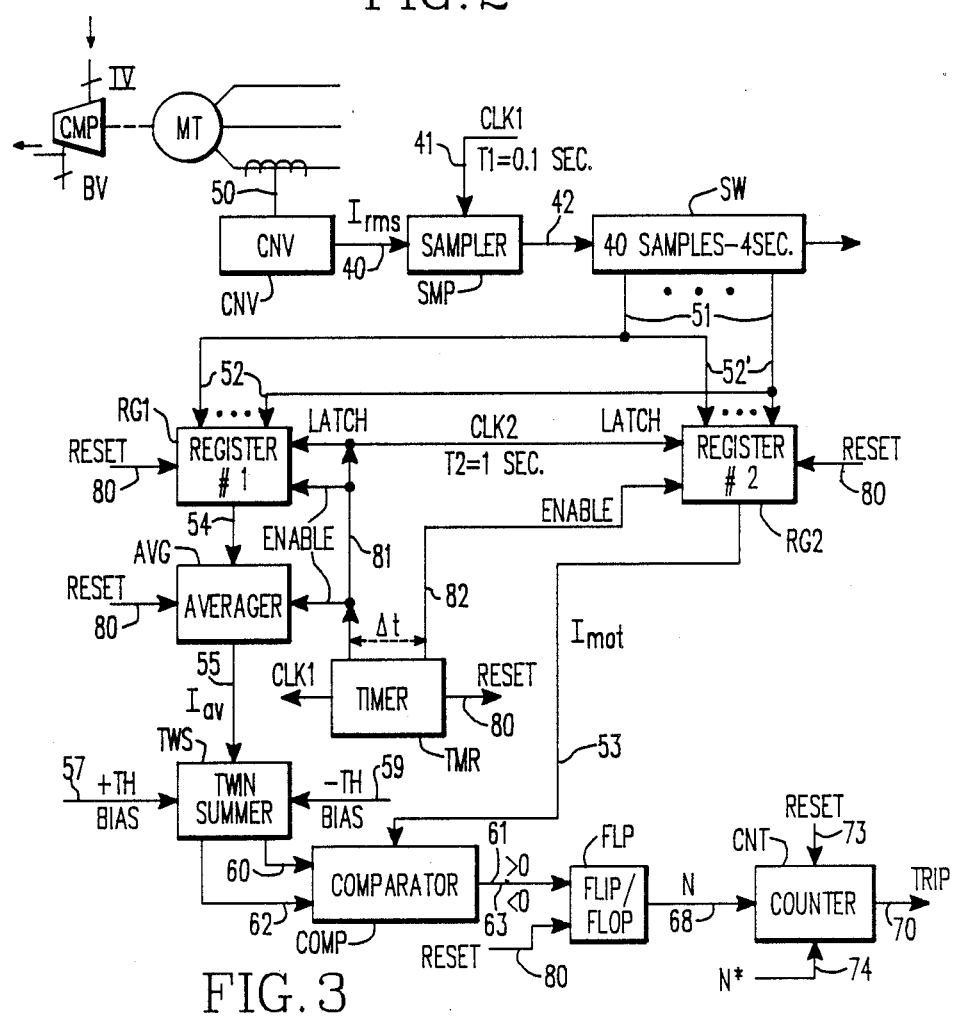
FIG. 3 is a block diagram of the surge detection system according to the invention which is part of the compressor control system of FIG. 1.
Figure 4:
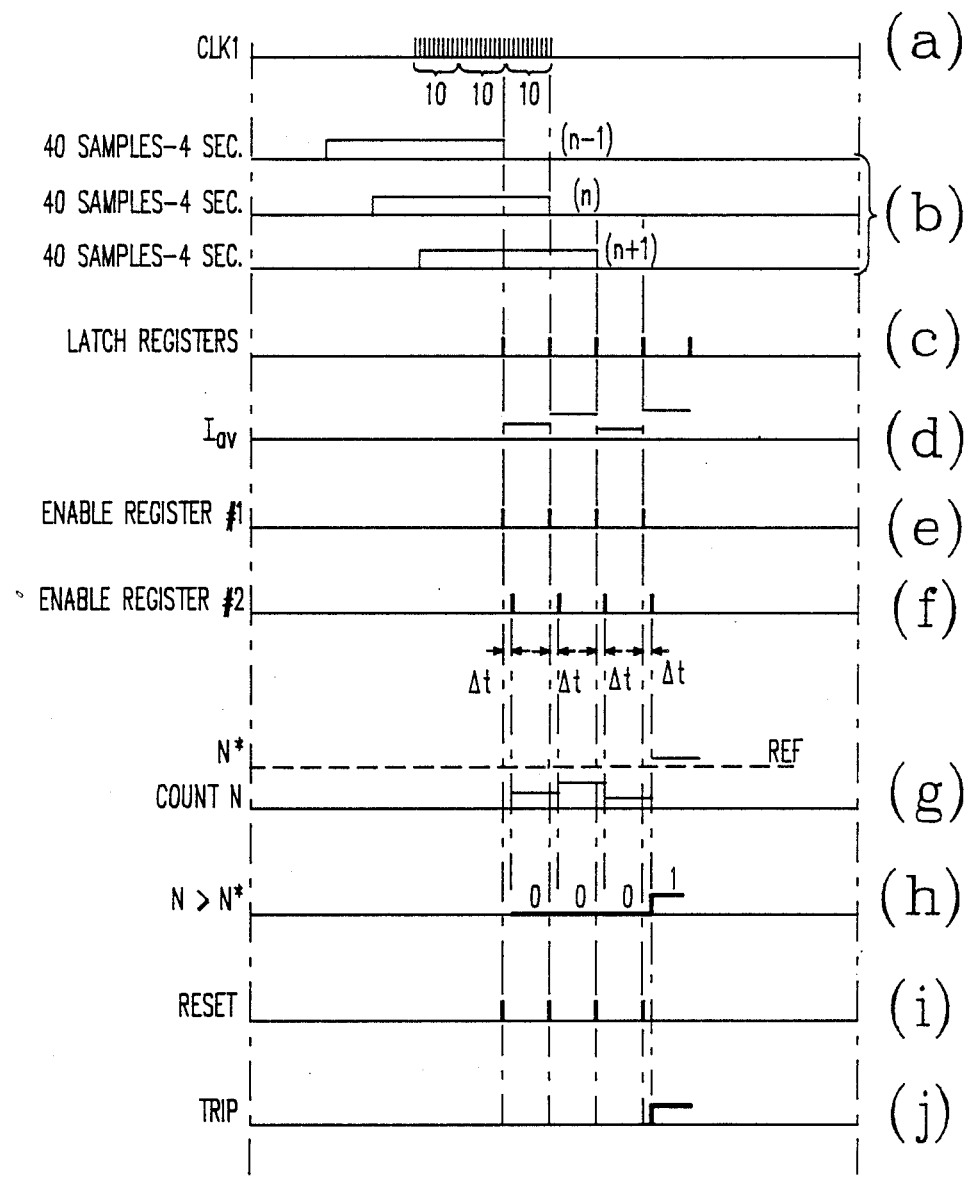
FIG. 4 illustrates with curves the occurrence of the control signals during the operation of the system of FIG. 3.

Referring to FIG. 3, a block diagram illustrates the internal organization, in terms of functions, of the microprocessor unit MCP in its operation as a surge detector according to the present invention. The motor current is sensed from line 50 with respect to one phase of the motor (C), then rectified by an AC/DC converter CNV to provide on line 40 a signal I representative of the rms value of the motor current. From line 40, the motor current representative signal is applied to a sampler SMP controlled by a clock signal CLK1 derived on line 41 from a timer TMR, so as to so many times sample the motor current Imot, typically every 1/10 of a second. The sampling pulses are shown in FIG. 4 under (a), ten sampling pulses appearing upon each passing of a second. These samples are passed by line 42 through a delay line SW, typically designed to contain 40 samples from the oldest to the latest received, thus, for a duration of 4 seconds. A clock signal CLK2 (shown under (c) in FIG. 4), also derived from timer TMR, is applied by line 81 so as to command latching into two registers RG1 and RG2 of data from the sampling window, via lines 52 for register #1 (RG1), via lines 52' for register #2 (RG2). Every second the registers are reset by line 80 from the timer. Therefore, every second within delay line SW, the 40 samples are being circulated so as to lose 10 samples at one end and to gain 10 samples at the other end, this will appear for the data latched into the registers.

FIG. 4 shows under (b) three trains of 40 samples displaced by 1 second, or 10 samples, for successive instants (n−1), n, and (n+1). Register #1 is enabled by line 81 so that data be passed by line 54 to an averager AVG. The average motor current is Iav, obtained on line 55 of FIG. 3. After a time lag of ΔT (typically of Δt=200 μs) following the instant that line 81 enables register #1 and the averager AVG, by line 82 timer TMR enables register #2, with the result that a sampled value of the motor current Imot is derived on line 53.

Iav is shown under (d) in FIG. 4, the value being valid for a period of 1 second. The enabling signals of lines 81 and 82 are shown under (e) and (f), respectively. The time delay ΔT, is required in order to allow the operation of the twin summeer TWS in generating the reference values applied on lines 60 and 62 ahead of the derivation of Imot on line 53, the three lines being applied to comparator COMP. Twin summer TWS receives the two value of $+TH$ and $-TH$ of FIG. 2, and this leads to the ordinates of thresholds THi and THl. The latter appear on lines 60 and 62, respectively. Comparator COMP relates Imot from line 53 to those two thresholds, and positive and negative polarity changes are generated on lines 66 and 67, one for the positive polarity being in relation to THi, the other for the negative polarity, thus, in relation to THl. A flip-flop FLP, reset by line 80, shifts from one state to the other when there is a change of polarity, and such occurrences are counted by a counter CNT responsive to line 68. A trip signal is generated on line 70 whenever the count N from line 68 reaches and exceeds a reference count N* applied on line 74. The counter is reset by line 73 upon each time interval of 1 second, thus, after each counting of Imot samples for a given Iav value under (d) in FIG. 4. FIG. 4 also shows under (g) how a count of N in such time interval may exceed the value N*. When this is the case, a logic 1 replaces the logic 0 on line 70 (under (h)) and a trip signal is applied to the compressor control unit CCU of FIG. 1.

Figure 5:
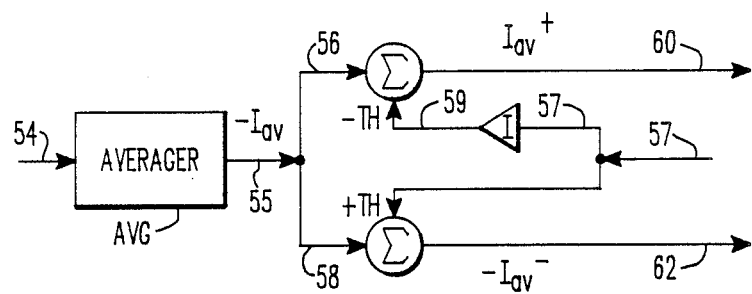
FIG. 5 is a block diagram of the internal organization of the twin summer used in FIG. 4 for the derivation of the thresholds to the comparator also of FIG. 4.
Figure 6:
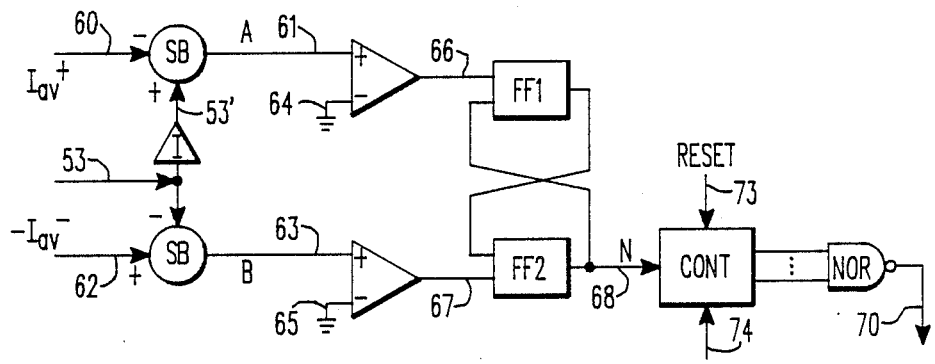
FIG. 6 is a block diagram illustrating the internal organization of the comparator and the trip signal derivation as taken from FIG. 3.

FIG. 5 shows an analog implementation of the twin summer TWS first responsive to the Iav signal of lines 55 and 58 and to the $+TH$ bias signal of line 57 with an output on line 62 of the signal $-Iav^{31}$, and secondly, responsive to the Iav signal of lines 55 and 56, and (after inversion between line 57 and line 59) to the $-TH$ bias signal of line 59 with an output Iav+ on line 60. The signal of line 55 is assumed to be negative ($-Iav$) in order to match the circuitry of FIGS. 7A and 7B hereinafter. FIG. 6 shows a hardware implementation of comparator COMP.

Figure 7A:
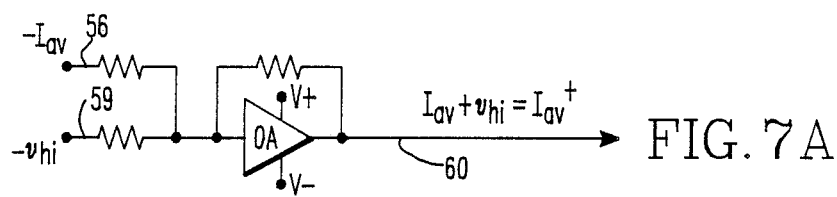
FIGS. 7A to 7E are operational amplifier implementations illustrating the hardware interconnection between the elements of FIGS. 5 and 6.
Figure 7B:
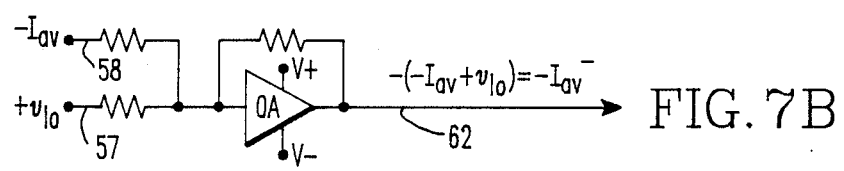
Figure 7C:
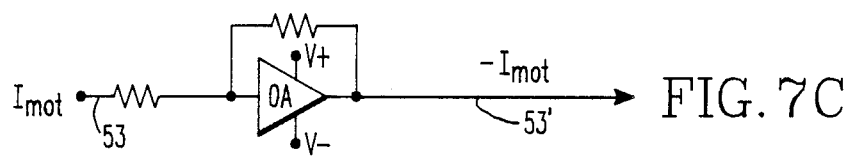
Figure 7D:
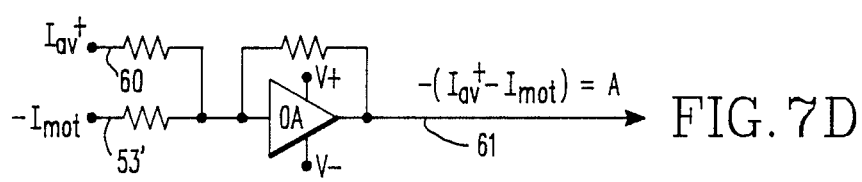
Figure 7E:
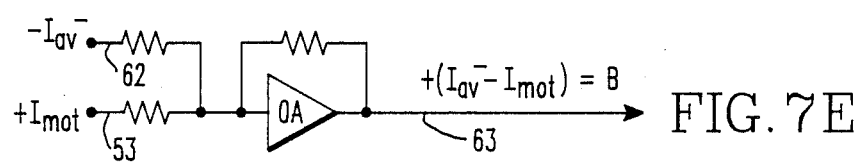

The circuits of FIGS. 5 and 6 are further illustrated in FIGS. 7A to 7E by an operational amplifier implementation. In FIG. 7A, for one half twin summer, signal $-Iav$ of line 56 combined with a voltage $-v_{hi}$ representing $+TH$ applied on line 59. Therefore, on line 60 at the output of the operational amplifier OA is the resulting signal $(Iav+v_{hi})=Iav^+$. Similarly, for the other half twin summer, on line 58 of FIG. 7B is applied the signal $-\text{Iav}$, and on line 57 is applied the voltage $+v_{lo}$ representing $-\text{TH}$ of FIG. 2. Therefore, on line 62 at the output of the operational amplifier OA is the resulting signal $-(-\text{Iav}+v_{lo})=-\text{Iav}^-$. FIG. 7C shows the signal Imot of line 53 being inverted by device I so as to provide on line 53' the opposite value $-\text{Imot}$. Considering now FIGS. 7D and 7E which belong to comparator COMP of FIG. 6, the outputted values of FIGS. 7A, 7B and 7C become here inputs, one leading in FIG. 7D to $-(\text{Iav}^+ - \text{Imot}) = A$ as output on line 61 for the corresponding operational amplifier OA, and the other leading in FIG. 7E to $+(\text{Iav}^- - \text{Imot}) = B$ as output on line 63 for the corresponding operational amplifier OA. From the preceding, it appears that whenever on line 53' the sample $-\text{Imot}$ is smaller than $\text{Iav}^+$, that is $\text{Imot} < (\text{Iav} + \text{TH})$, like at point C on curve (C) of FIG. 2, the output A, on line 61, is negative. Therefore, on line 66 into the flip-flop FF1 of FIG. 6, the logic is low and the flip-flop is not triggered. This is because, for point C, Imot does not exceed the threshold THi. For point D, however, the quantity A is positive and line 61 becomes high, thereby triggering flip-flop FF1. In the same way, for point E on the curve of FIG. 2, line 53 has Imot smaller than $-\text{Iav}^-$, that is $\text{Imot} > (\text{Iav} - \text{TH})$ and the output B, on line 63, is negative. This is because point E does not exceed the lower threshold. The logic of line 63 is low and flip-flop FF2 is not triggered. For point F, however, the logic of line 63 becomes high and flip-flop FF2 is triggered, because the threshold TH1 has been exceeded. Indeed, having triggered one flip-flop there will be a count of a change of polarity on line 68 of FIG. 3 only if such triggering happens from one flip-flop to the other.

From FIGS. 2, 3, 5, 6 and 7A to 7E it appears that, according to the present invention, motor current is sampled every 0.1 second and a profile (or array) SW is maintained containing the latest 40 samples of motor current. The array is examined once each second to determine if a surge condition exists. A surge condition is determined by first calculating a "sliding" average value Iav of motor current based on the latest 40 samples of motor current stored in SW. The individual samples are then sequentially examined from the oldest to the newest with respect to the sliding average. A "polarity" change is maintained by defining a "positive" change in polarity as a motor current value in excess of the "sliding" average by a predetermined threshold amount and a "negative" change being a motor current value below the "sliding" average by a predetermined threshold. The number of times N that the "polarity" changes over this four second interval (40 samples) is then recorded and compared to a reference value N*. If the number N exceeds or equals the value N*, then a surge condition exists.

FIG. 6 shows comparator CMP associated with the flip-flops FF1 and FF2. The counter CONT here runs with the pulses of line 68 applied thereto, and the digital count (6 bits for instance) is compared with the reference count N* of lines 74 (also 6 bits). When the limit count N* has been reached, lines 72 at the output will have all Zero, so that a ONE will appear on line 70 at the output of the NOR device, indicating a surge.

Figure 8:
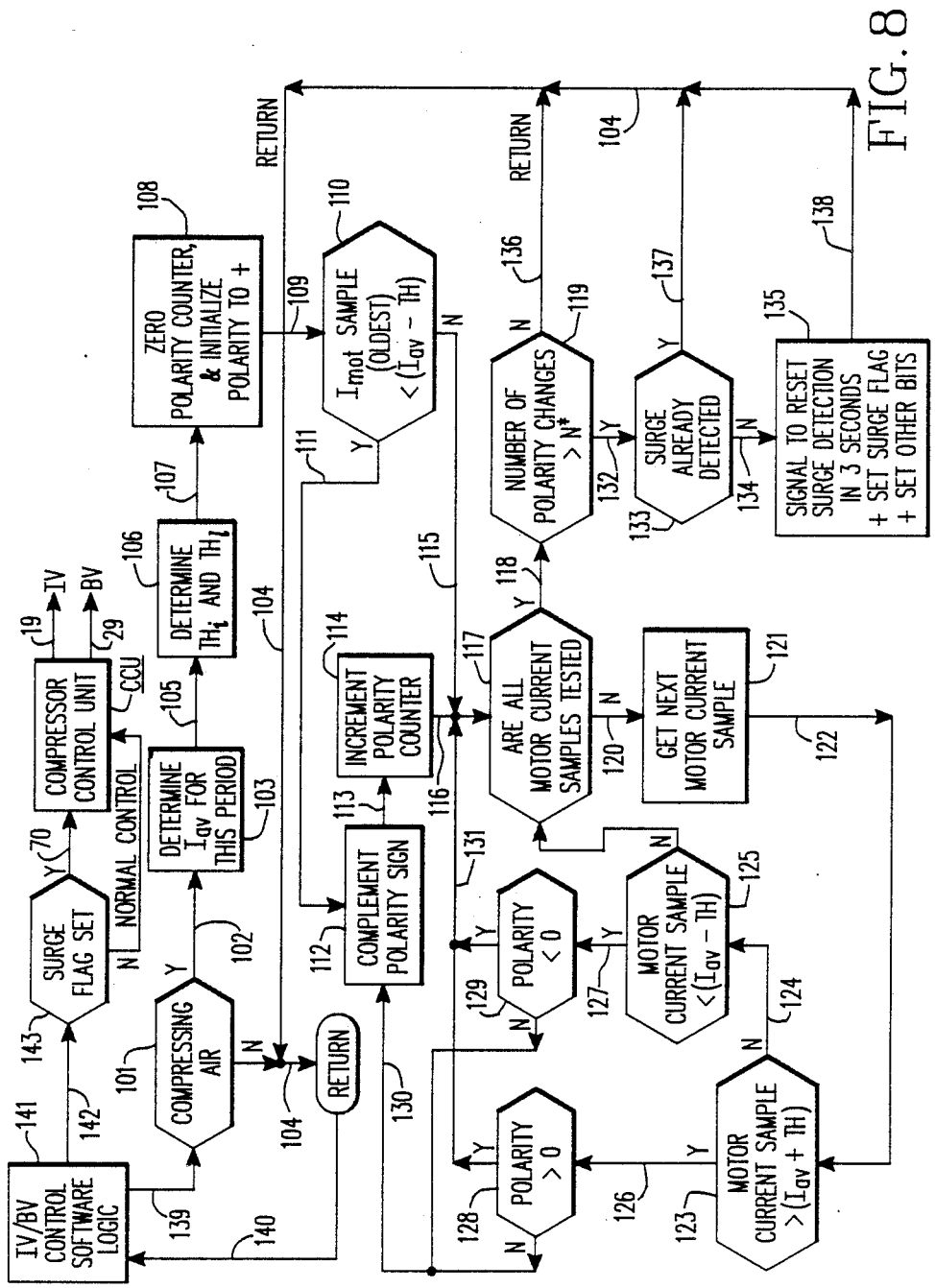
FIG. 8 is a flow chart explaining the steps involved in the operation of a microprocessor implementation of the circuit of FIG. 3.

FIG. 8 is a flow chart explaining the software steps involved with the computer system MCP of FIG. 1. The steps are as follows:

At 101 the question is raised whether the compressor is compressing air. If No, by line 104 the system goes to Return. If Yes, by 102 the next step is at 103 to ascertain what the average motor current (Iav) is for the present period. Then, by 105 the system goes to 106 where is determined what are the upper and lower thresholds (THi and THl, which are assumed to be +TH and −TH in FIG. 2, and this is also what has been translated into voltages vhi and vlo for the operational amplifier inputs of FIGS. 7A and 7B). Thereafter, by line 107, the system goes to 108 where the polarity counter (CNT in FIGS. 3 and 6) is set to zero for the start. Moreover at such initial step, the polarity is assumed to be the "positive" one. This means that the polarity last encountered by the flip-flops is assumed to be for a point on curve (C) of FIG. 2 which was lastly above the upper threshold THi but is still above the lower threshold. This being done, by line 109 the system goes to block 110 where the question is: "whether for the oldest sample: $\text{Imot} < (\text{Iav} - \text{TH})$?" This amounts to testing whether the polarity assumed to be "positive" is truly so. The question raised is whether the operative point is below the lower threshold rather than above. There are two possibilities. One is that the operative point for Imot remains above the lower threshold and there is no change of polarity, thus, the answer is NO on line 115. The other is that Imot has passed below the lower threshold, this means a change of polarity (from positive to negative): Therefore, by line 111 the system goes to block 112 where the polarity will be changed to the opposite one (the former assumption being wrongly to be positive). Such change of polarity is accounted for by counter CNT, at block 114, reached via line 113. As earlier stated, if at 110 the answer to $\text{Imot} < (\text{Iav} - \text{TH})$ is negated, by line 115 the system goes directly to line 116 without passing through a count at 114. Thereafter, by 120 the system goes to 121 where the next sample is taken into consideration. This will be done for all samples during the period (since there are 40 samples, it takes 4 second maximum to count at 114 the polarity changes and to see whether they reach and exceed the reference number N*), and it will be determined at 117 whether all samples have been tested. With each sample at 121, by line 122 the system goes to 123 where the test is whether $\text{Imot} > (\text{Iav} + \text{TH})$. This is, like for quantity A in FIG. 7D, assuming that the operative point on curve (C) exceeds the upper threshold THi and, therefore, that the polarity is positive. If it is so, by line 126 the next step is to check whether the last polarity recorded was also positive. If it is so, the conclusion is that there is no polarity change and by line 131, the system bypasses block 112, going directly to block 121 by lines 116 and 120. Otherwise, by line 130 (which means a NO) a change of polarity is effected at 112 followed via line 113 by a count at 114. If there is a NO on 124, from block 123 the test becomes at block 125 whether $\text{Imot} < (\text{Iav} - \text{TH})$. This is like under FIG. 7E with quantity B. If this is true, by line 127 there should be a negative polarity. If at 129 there is indeed already a negative polarity, no change of polarity (triggering) need to take place and the system by line 131 goes directly to lines 116, 120 onto block 121 for the next sample of Imot. If the actual polarity was positive, block 129 will say NO on line 130, thereby indicating a change of polarity (triggering). Such change is acknowledged and counted at 114. This goes until the last sample acknowledged at 117. Then, by line 118 the test becomes at 119 whether N* such changes have been taking place. If so, by line 132 (with a YES) and via line 134 (if at 133 a surge has not already been detected) the system goes to block 135 where the flag is set to indicate a "surge".

Then, by lines 138 and 104 the system goes back to RETURN. The inlet valve and bypass valve control software logic at 141 is the one which by line 139 initiates at 101 the routine just considered. When a "set surge flag" logic has been received from line 138 and passed to RETURN by line 104, this is acknowledged by line 140 within block 141. The fact is established at 143 in another routine which by line 70 generates the command to the compressor control unit CCU of FIG. 1. Otherwise, that is, if there has been no surge flag set in the course of the time interval defined at 117 and as ascertained at 133, normal control will take place from block 143 to block CCU. The questions and answers between these two routines, namely between lines 139 and 140 is about 3 ms. If there has been no surge detection, there is a NO from block 119 with a return by line 136, and if there has been a surge already detected, there will be a return from block 133 via line 137. If the reference count N* has not been reached at 119, while incrementing counter CNT at 114, the decision is to return via line 104. If this is the first time that polarity changes have equated or exceeded N*, the command is to reset the surge detection in 3 second, to set the surge flag, and to set the other bits. This is done at 135 and the system returns by 104 for further testing of a possible surge occurrence.

Figure 9:
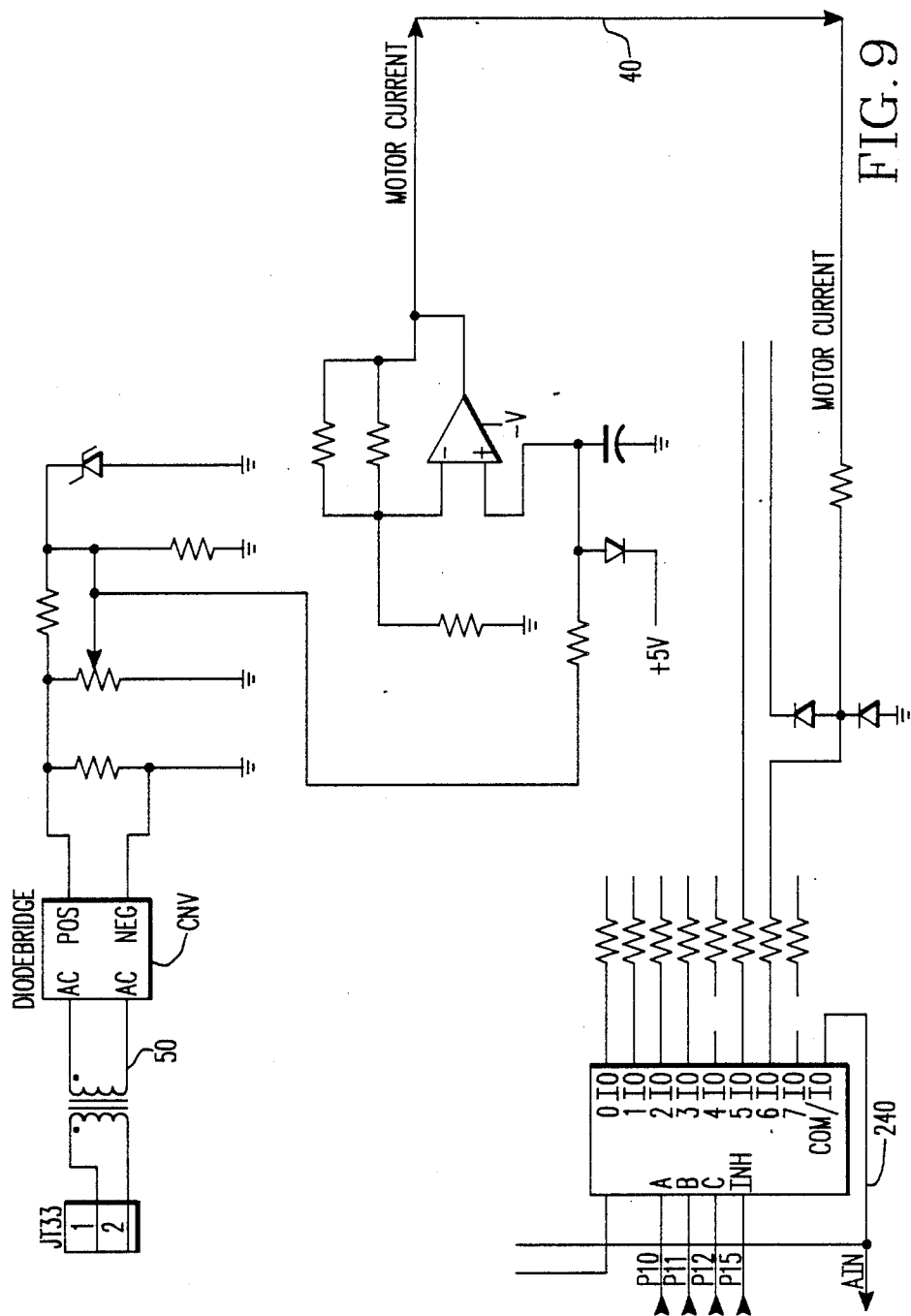
FIG. 9 shows the solid state implementation of the circuit for the derivation of a signal representing the motor current.
Figure 10A:
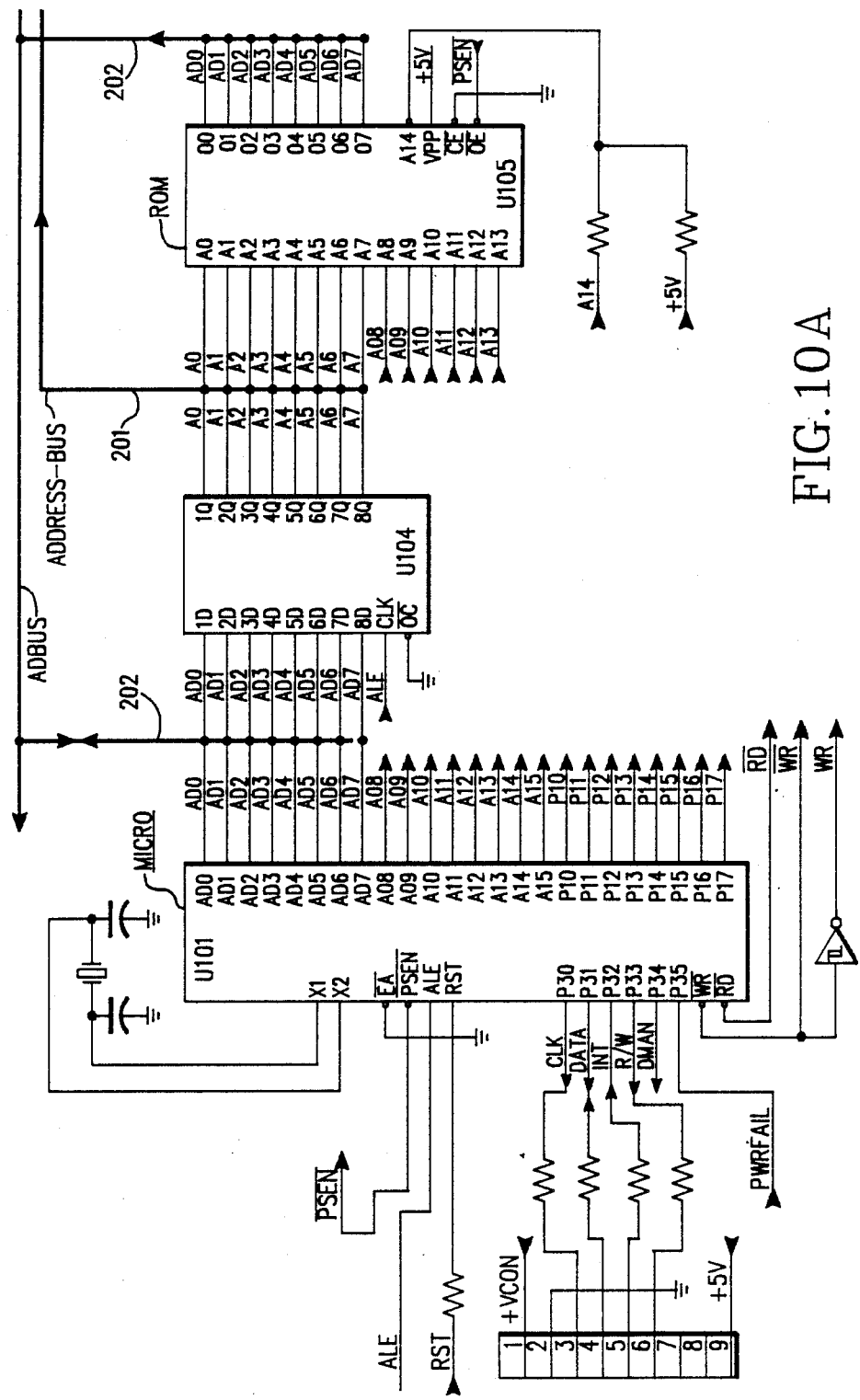
FIGS. 10A to 10E are illustrating the solid state implementation of the circuit of FIG. 3 when built around a microcomputer.
Figure 10B:
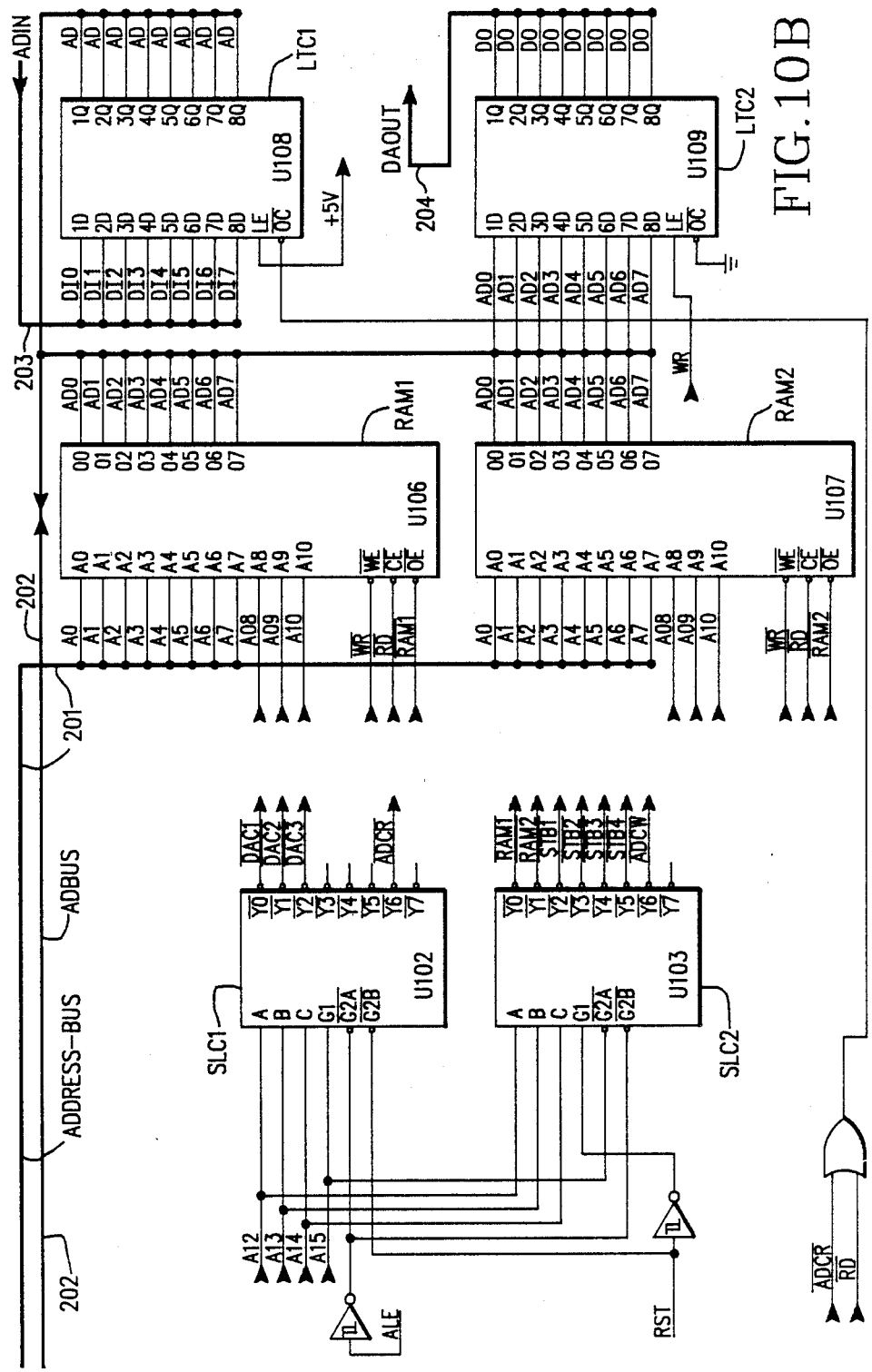
Figure 10C:
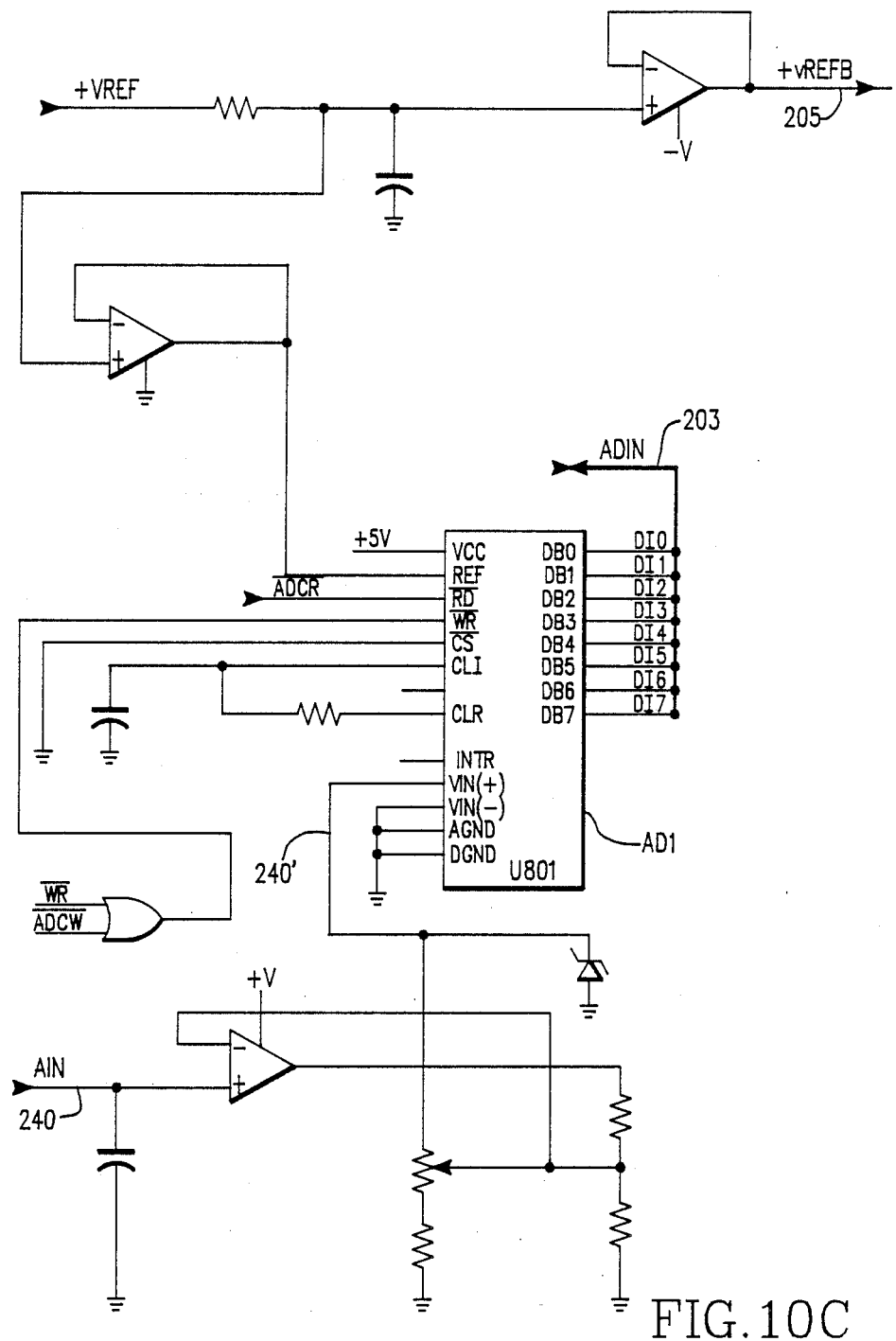
Figure 10D:
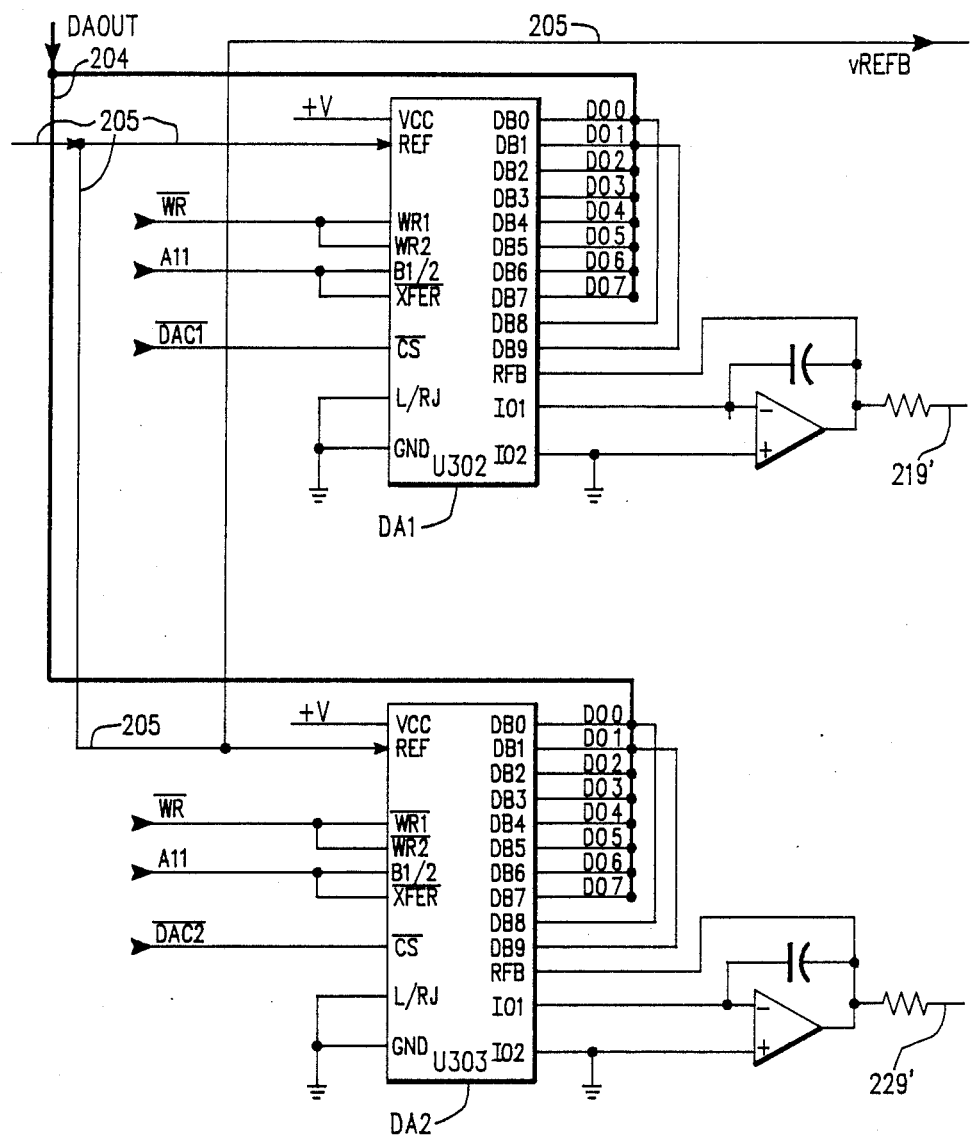
Figure 10E:
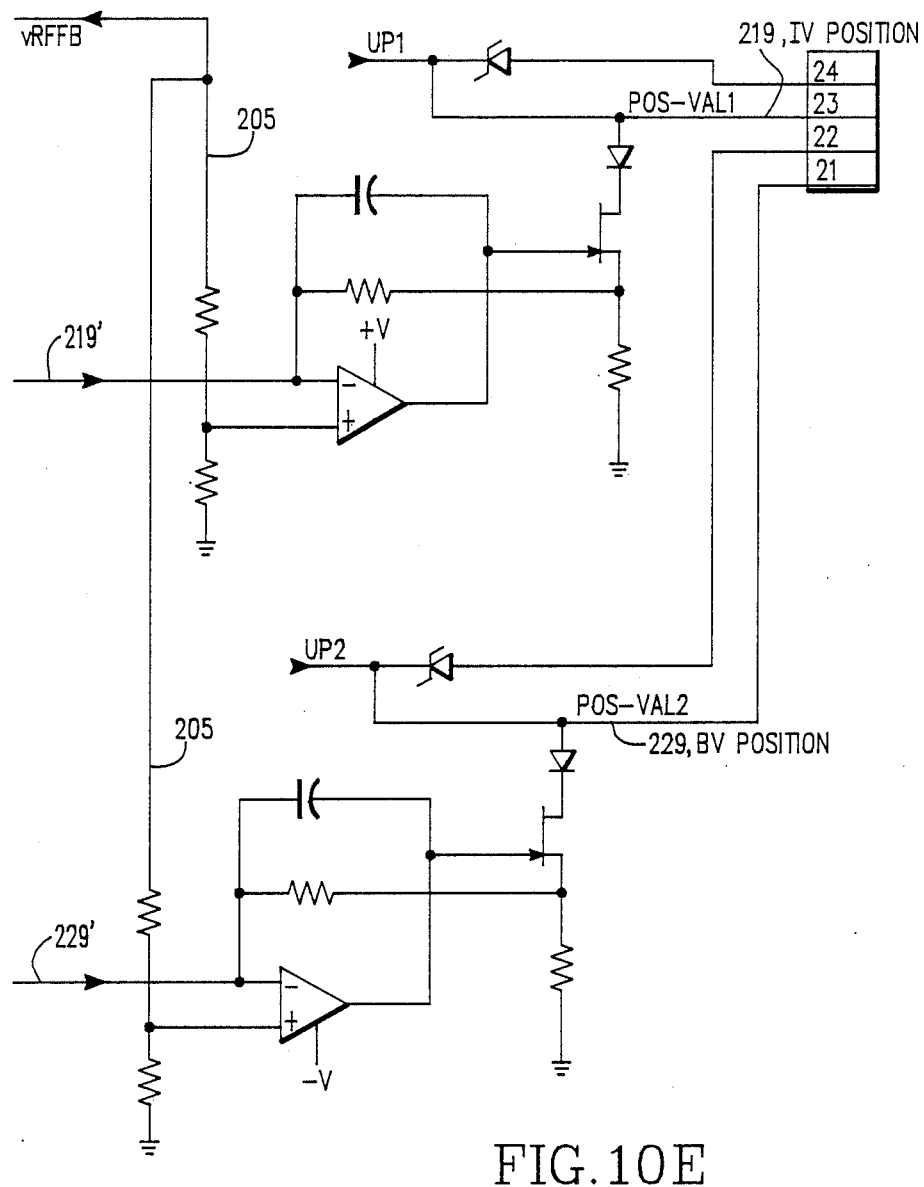

The flow chart steps are performed by the computer control unit MCP illustrated by FIGS. 9 and 10A to 10E. The computer control unit includes a microcomputer MICRO (in FIG. 10A). FIG. 9 shows the derivation of the motor current representative signal, on line 40, after conversion by converter CNV of the AC current of the motor. The motor current signal is passed thereafter on line 240 toward line 240' of FIG. 10C at the input of the A/D converter section of the computer control unit. AD converter AD1 there generates on line 203 the ADIN data for treatment by the microcomputer. Two RAM devices are shown in FIG. 10B, one volatile, the other non-volatile. Line 203 of FIG. 10C goes to a latch LTC1 (FIG. 10B) which passes data, via data bus 202 (ADBUS), to a RAM device (RAM1) that is addressed by address bus 201 (ADDRESS BUS) from the MICRO (FIG. 10A). One of these two RAM devices is equivalent to registers RG1 and RG2 of FIG. 3. FIG. 10B also shows a latch LTC2 which is passing data from RAM1, as well as from another RAM device (RAM2), on line 204 (DAOUT) onto digital to analog converters DA1 and DA2 outputting analog signals on lines 219' and 229' (FIG. 10D) when line 70 (FIG. 1) commands tripping of the inlet valve and the bypass valve (IV and BV), respectively. The commands of lines 219' and 229' are passed on lines 219 and 229, respectively, which are similar to lines 19 and 29 of FIG. 1. The internal operation of the microcomputer MICRO handling data in digital form as received or as generated is according to the flow chart of FIG. 8. The solid state devices used for such software operation which have been labelled in the Figures are well understood as to their nature and mode of operation. Thus, the motor current analog value AIN carried on line 240 of FIG. 9 is brought via lines 240 and 240' onto the A/D converter AD1 to become its digital counter part ADIN of line 203 of FIG. 10C. From there ADIN is stored in latch LTC1 of FIG. 10B. The microcomputer MICRO of FIG. 10A receives or generates data in its various operations which are transmitted along ADBUS line 202 from or onto the ROM of FIG. 10A, the registers (RG1 and RG2) implemented as RAM's (RAM1 in this case) and/or the latches LTC1, LTC2 of FIG. 10B, the address bus (line 201) making the selection of the locations in the devices. A signal +vREF is shown on line 205 which is used for scaling of the value of the positioning signals for the inlet valve (IV) on line 219 (which matches line 19 of FIG. 1) and for the bypass valve (BV) on line 229 (which matches line 29 of FIG. 1).

For completion of the description of FIGS. 8, 9, and 10A to 10E, reference is made to the listings placed in Appendix thereafter.

APPENDIX

MCS-51 MACRO ASSEMBLER    IR CURRENT DETERMINED SURGE DETECTION CODE-V0.1

ISIS-II MCS-51 MACRO ASSEMBLER V2.1
OBJECT MODULE PLACED IN :F1:ISURGE.OBJ
ASSEMBLER INVOKED BY:  ASM51 :F1:ISURGE.SRC

```
LOC  OBJ            LINE    SOURCE

1      $TITLE(IR CURRENT DETERMINED SURGE DETECTION CODE-V0.1)
                     2      $DATE(08-31-87)
                     3      $DEBUG
                     4      $XREF
                     5      $NOMACRO
                     6      ;
                     7      ;              WRITTEN BY:    R. T. ELMS
                     8      ;              REVISION:      0.1
                     9      ;*************************************************************
                    10      ;
                    11      ;THIS CODE IS EXECUTED IN THE "1.0 SEC" ROUTINE. IT LOOKS AT THE LATEST
                    12      ;40 (0.1 SEC) SAMPLES OF MOTOR CURRENT AND CHECKS FOR A MODULATION OF
                    13      ;THE ENVELOPE ABOUT THE AVERAGE VALUE IN EXCESS OF A THRESHOLD SETPOINT
                    14      ;AND COUNTS THE NUMBER OF POLARITY CHANGES OF THE MODUALTION DEFINED
                    15      ;ABOVE IN ORDER TO DETECT A "SURGE" CONDITION.
                    16      ;-----------------------------------------------------------------
                    17      ;DEFINITIONS:
                    18
                    19      ;   IMOT_ARRAY IS THE STARTING LOCATION OF THE MOST RECENT 40 SAMPLES
                    20      ;       OF MOTOR CURRENT EACH SAMPLE IS TWO BYTES (ARRAY IS 80 BYTES).
                    21
                    22      ;   IMOT_ARRAY_PTR IS THE POINTER INTO THE MOTOR CURRENT ARRAY. THIS
                    23      ;       POINTER INDICATES THE STARTING LOCATION OF THE OLDEST DATA.
                    24
                    25      ;   IAVERAGE IS THE AVERAGE VALUE OF THE 40 SAMPLES OF MOTOR CURRENT
```

```
26    ;         IN ARRAY IMOT_ARRAY ABOVE.
27
28    ;    ISPICKUP IS THE SURGE PICKUP VALUE IN PERCENT OF FULL LOAD MOTOR
29    ;         CURRENT. ISPICKUP=(SPICKUP/(256)**2)(I FULL LOAD)
30
31    ;    ISTHRLOW IS THE LOW THRESHOLD VALUE FOR THE MODULATION ENVELOPE
32    ;         OF MOTOR CURRENT. ISTHRLOW=(IAVERAGE)(1-(THRESH/(256)**2))
33
34    ;    ISTHRHI IS THE HIGH THRESHOLD VALUE FOR THE MODULATION ENVELOPE
35    ;         OF MOTOR CURRENT. ISTHRHI=(IAVERAGE)(1+(THRESH/(256)**2))
36
37    ;    SPOLCNT IS THE COUNT OF THE POLARITY CHANGES RELATIVE TO THE ABOVE
38    ;         THRESHOLDS OF MOTOR CURRENT IN THE 4 SECOND ARRAY OF SAMPLES.
39
40    ;
41    ;----------------------------------------------------------------
42    ;
43    $EJECT
44    ;
45    ;                    PROCEDURE DESCRIPTION
46    ;
47    ;         1. IF SYSTEM IS UNLOAD, SKIP THIS SURGE TEST
48    ;         2. CALCULATE AVERAGE MOTOR CURRENT OVER LATEST 40 SAMPLES
49    ;         3. CALCULATE OR GET SETPOINTS
50    ;         4. ZERO "SURGE POLARITY" COUNTER
51    ;         5. SET "POLARITY" TO POSITIVE
52    ;         6. IF OLDEST MOTOR CURRENT SAMPLE IS LESS THAN "ISTHRLOW",
53    ;              SET "POLARITY" TO NEGATIVE
54    ;     --> 7. GET VALUE OF NEXT MOTOR CURRENT SAMPLE
55    ;      \  8. IF VALUE IS LESS THAN "ISTHRLOW", SET "TEMP. POLARITY" NEG
56    ;      /  9. IF VALUE IS GREATER THAN "ISTHRLOW", SET "TEMP. POLARITY"
57    ;      \       POSITIVE
58    ; LOOP 10. IF "TEMP. POLARITY" IS NOT THE SAME AS "POLARITY", THEN
59    ;      /       INCREMENT "SURGE POLARITY" COUNTER
60    ;      \ 11. SET "POLARITY" EQUAL TO "TEMP. POLARITY"
61    ;     <-- 12. DO NEXT CURRENT SAMPLE IF ANY REMAINING
62    ;        13. IF "SURGE POLARITY" COUNTER => "SCOUNT", SET "SURGE" FLAG
63    ;        14. EXIT ROUTINE
64    ;
65    ; LIMITATIONS: DUE TO HARDWARE "RC" FILTERING AND 0.1 SECOND DATA
66    ;         SAMPLING RATE, SURGE CYCLES WITH A FREQUENCY IN EXCESS OF
67    ;         4 HERTZ MAY NOT BE DETECTED BY THIS TECHNIQUE.
68    ;
69    ; THIS SURGE TESTING IS DONE ONCE PER SECOND
70    ;
71    ;****************************************************************
72    ;****************************************************************
73    ;        WORST CASE EXECUTION TIME (IN INSTRUCTION CYCLES)
74    ;****************************************************************
75    ;
76    ;        COMPRESSOR UNLOADED ----- NNN INSTRUCTION CYCLES
77    ;
78    ;
79    ;        COMPRESSOR LOADED ------- NNN INSTRUCTION CYCLES
80    ;
81    $EJECT
82    ;
83    ;****************************************************************
84    ;****************************************************************
85    ;
86    ;                 MEMORY SEGMENT DEFINITION
87    ;
88    ;****************************************************************
89
90    SURGE_CODE_SEGMENT       SEGMENT        CODE    UNIT
91    VRAM                     SEGMENT        XDATA   UNIT
92
93    ;
94    ;****************************************************************
95    ;****************************************************************
96    ;
97    ;                        EQUATES
98    ;
99    ;****************************************************************
100   ;
101   SPICKUP       EQU     3277
102   THRESH        EQU     6554
103   SCOUNT        EQU     0FBH    ; -5 DECIMAL
104   ;
105   ;****************************************************************
106   ;****************************************************************
107   ;
108   ;                EXTERNAL MEMORY DEFINITIONS
109   ;
110   ;****************************************************************
111   ;
112
113   EXTRN   XDATA   (IMOT_ARRAY,IMOT_ARRAY_PTR)
114   EXTRN   XDATA   (ISPICKUP,IAVERAGE,ISTHRLOW,ISTHRHI,SPOLCNT)
115   EXTRN   CODE    (DMULT)
116           ;DMULT IS A 2 BY 2 BYTE MULTIPLY ROUTINE
117           ;WHERE (R4,R5,R6,R7)=(R0,R1)*(R2,R3)
118   EXTRN   DATA    (TEMP0,TEMP1,TEMP2,TEMP3,TEMP4,TEMP5,TEMP6,TEMP7)
119   EXTRN   BIT     (SURGE_FREEZE_FLG, MODFLG)
120   RSEG    VRAM
```

OCCD — line 101
199A — line 102
00FB — line 103

```
                        121    ;
                        122    ;
                        123    ;****************************************************************
                        124    ;****************************************************************
                        125    ;
                        126    ;                        CODE MEMORY
                        127    ;
                        128    ;****************************************************************
                        129    ;****************************************************************
                        130    ;SPECIAL INSTRUCTION NOTE:
                        131    ;          "CJNE X,Y,ADDRESS"
                        132    ;          (1)   IF X = Y NEXT INSTRUCTION IS EXECUTED AND CARRY= 0
                        133    ;          (2)   IF X < Y PROGRAM JUMPS TO "ADDRESS" AND CARRY= 1
                        134    ;          (3)   IF X > Y PROGRAM JUMPS TO "ADDRESS" AND CARRY= 0
                        135    ;
                        136    ;****************************************************************
                        137            $EJECT
                        138
                        139
                        140            PUBLIC    ISURGE
                        141            PUBLIC    STAVG
                        142            PUBLIC    MULT3X2
                        143
----                    144            RSEG      SURGE_CODE_SEGMENT
                        145
0000 200001    F        146    ISURGE: JB        MODFLG,CONTIN
0003 22                 147            RET
0004 120000    F        148    CONTIN: CALL      STAVG      ;GET AVERAGE VALUE OF 40 MOTOR CURRENT SAMPLES
0007 120000    F        149            CALL      THRES      ;GET SETPOINTS BASED ON AVERAGE VALUE
000A E4                 150            CLR       A
000B F500      F        151            MOV       TEMP0,A    ;CLEAR TEMPORARY VALUE OF POLARITY COUNT
000D F500      F        152            MOV       TEMP1,A    ;CLEAR TEMPORARY VALUE OF POLARITY TO "POSITIVE"
000F 900000    F        153            MOV       DPTR,#IMOT_ARRAY_PTR
0012 E0                 154            MOVX      A,@DPTR
0013 FE                 155            MOV       R6,A       ;SAVE ARRAY INDEX POINTER FOR NEWEST SAMPLES
0014 C3                 156            CLR       C
0015 13                 157            RRC       A          ;DIVIDE BY TWO AND GET NUMBER OF ARRAY WORDS
0016 F4                 158            CPL       A          ;LEFT TILL END OF ARRAY BY SUBTRACTING POINTER
0017 2428               159            ADD       A,#40      ;FROM ARRAY "WORD" SIZE (80 BYTES/2=40 WORDS).
0019 FF                 160            MOV       R7,A       ;SAVE WORD COUNTER FOR OLDEST SAMPLES
001A 900000    F        161            MOV       DPTR,#ISTHRLOW
001D E0                 162            MOVX      A,@DPTR    ;GET LOW BYTE OF LOW THRESHOLD VALUE OF CURRENT
001E F500      F        163            MOV       TEMP2,A
0020 A3                 164            INC       DPTR
0021 E0                 165            MOVX      A,@DPTR    ;GET HIGH BYTE OF LOW THRESHOLD VALUE OF CURRENT
0022 F500      F        166            MOV       TEMP3,A
0024 900000    F        167            MOV       DPTR,#ISTHRHI
0027 E0                 168            MOVX      A,@DPTR    ;GET LOW BYTE OF HIGH THRESHOLD VALUE OF CURRENT
0028 F500      F        169            MOV       TEMP4,A
002A A3                 170            INC       DPTR
002B E0                 171            MOVX      A,@DPTR    ;GET HIGH BYTE OF HIGH THRESHOLD VALUE OF CURRENT
002C F500      F        172            MOV       TEMP5,A
002E 900000    F        173            MOV       DPTR,#IMOT_ARRAY
0031 E582               174            MOV       A,DPL      ;ADD POINTER TO ARRAY STARTING LOCATION FOR
0033 2E                 175            ADD       A,R6       ;MOTOR CURRENT SAMPLE
0034 F582               176            MOV       DPL,A
0036 E4                 177            CLR       A
0037 3583               178            ADDC      A,DPH
0039 F583               179            MOV       DPH,A
003B E0                 180            MOVX      A,@DPTR    ;GET OLDEST MOTOR CURRENT SAMPLE AND CHECK THRESH
003C C3                 181            CLR       C
003D 9500      F        182            SUBB      A,TEMP2    ;SUBTRACT LOW THRESHOLD VALUE FROM MOTOR CURRENT
003F A3                 183            INC       DPTR
0040 E0                 184            MOVX      A,@DPTR
0041 9500      F        185            SUBB      A,TEMP3
0043 5003               186            JNC       CONT1      ;NO CARRY IF OLDEST SAMPLE IS ABOVE THRESHOLD
0045 7500FF    F        187            MOV       TEMP1,#0FFH ;CHANGE TEMP POLARITY TO NEGATIVE
0048 EF                 188    CONT1:  MOV       A,R7       ;R7 IS NUMBER OF WORDS LEFT UNTILL END OF ARRAY
0049 6005               189            JZ        LASTS      ;IF R7 IS ZERO GO TO BEGINNING OF ARRAY
004B 120000    F        190    FIRSTS: CALL      SCHECK     ;GET SAMPLE AND CHECK FOR POLARITY CHANGE
004E DFFB               191            DJNZ      R7,FIRSTS  ;GO TO END OF ARRAY
0050 EE                 192    LASTS:  MOV       A,R6       ;NUMBER OF NEW ARRAY WORD SAMPLES REMAINING
0051 6008               193            JZ        SCKDN      ;IF NO WORDS THEN CHECK FOR SURGE CONDITION
0053 900000    F        194            MOV       DPTR,#IMOT_ARRAY
0056 120000    F        195    CONT2:  CALL      SCHECK
0059 DEFB               196            DJNZ      R6,CONT2   ;CHECK REMAINING SAMPLES
                        197
                        198    ; NOW CHECK NUMBER OF ZERO CROSSINGS OF MOTOR CURRENT ENVELOPE
                        199
005B 900000    F        200    SCKDN:  MOV       DPTR,#SPOLCNT  ;SURGE POLARITY COUNTER
005E E500      F        201            MOV       A,TEMP0
0060 F0                 202            MOVX      @DPTR,A    ;SAVE NEW COUNT
0061 24FB               203            ADD       A,#SCOUNT  ;TEST FOR SURGE CONDITION
0063 5002               204            JNC       SDONE
0065 D200      F        205            SETB      SURGE_FREEZE_FLG
0067 22                 206    SDONE:  RET
                        207    ;
                        208    ;****************************************************************
                        209    ;****************************************************************
                        210    ;THIS ROUTINE TAKES THE 80 BYTE ARRAY OF 40 MOTOR CURRENT SAMPLES
                        211    ;AND SEQUENTIALLY ADDS EACH WORD (VALUE OF MOTOR CURRENT) AND THEN
                        212    ;DIVIDES THAT SUM BY 40 (THE NUMBER OF WORDS) TO GENERATE THE AVERAGE
                        213    ;VALUE OF MOTOR CURRENT. (THE DIVISION BY A CONSTANT IS HANDLED AS
                        214    ;A MULTIPLICATION FOLLOWED BY DIVISION BY A POWER OF 256).
                        215    ;****************************************************************
```

```
0068 900000   F   217  STAVG:  MOV    DPTR,#IMOT_ARRAY       ;START OF 40 TWO BYTE NUMBERS
006B 7C27         218          MOV    R4,#39
006D E0           219          MOVX   A,@DPTR
006E FD           220          MOV    R5,A
006F A3           221          INC    DPTR
0070 E0           222          MOVX   A,@DPTR
0071 FE           223          MOV    R6,A
0072 7F00         224          MOV    R7,#0
0074 A3           225  LOOPSA: INC    DPTR                   ;CALCULATE AVERAGE= (SUM OF VALUES)/40
0075 E0           226          MOVX   A,@DPTR
0076 2D           227          ADD    A,R5
0077 FD           228          MOV    R5,A
0078 A3           229          INC    DPTR
0079 E0           230          MOVX   A,@DPTR
007A 3E           231          ADDC   A,R6
007B FE           232          MOV    R6,A
007C 5001         233          JNC    NOCARY
007E 0F           234          INC    R7
007F DCF3         235  NOCARY: DJNZ   R4,LOOPSA
0081 7466         236          MOV    A,#66H                 ;IAVERAGE=(ISUM/(256**2)(((256)**2)/40)
0083 7906         237          MOV    R1,#6H
0085 120000   F   238          CALL   MULT3X2
0088 22           239          RET                           ;IAVERAGE IS IN (R5,R6,R7) [ NOTE R7=0 ]
                  240  ;
                  241  ;********************************************************************
                  242  ;********************************************************************
                  243  ;THIS ROUTINE TAKES THE AVERAGE VALUE OF THE 40 SAMPLES OF MOTOR
                  244  ;CURRENT AND CREATES A PAIR OF THRESHOLD LIMITS ABOVE AND BELOW
                  245  ;THAT AVERAGE BY AN AMOUNT DEFINED BY A "THRESH" CONSTANT.
                  246  ;********************************************************************
                  247  ;
0089 8D00     F   248  THRES:  MOV    TEMP0,R5               ;TEMPORARILY SAVE VALUE OF IAVERAGE
008B AA00     F   249          MOV    R2,TEMP0
008D 8E00     F   250          MOV    TEMP1,R6
008F AB00     F   251          MOV    R3,TEMP1
0091 789A         252          MOV    R0,#LOW(THRESH)
0093 7919         253          MOV    R1,#HIGH(THRESH)
0095 120000   F   254          CALL   DMULT                  ;OFFSET=(IAVERAGE/(256**2))(THRESH)
0098 900000   F   255          MOV    DPTR,#ISTHRHI
009B E500     F   256          MOV    A,TEMP0                ;CALCULATE THE HIGH THRESHOLD SETPOINT VALUE
009D 2E           257          ADD    A,R6                   ;HIGH THRESHOLD=(IAVERAGE+OFFSET)
009E F0           258          MOVX   @DPTR,A
009F A3           259          INC    DPTR
00A0 E500     F   260          MOV    A,TEMP1
00A2 3F           261          ADDC   A,R7
00A3 F0           262          MOVX   @DPTR,A
00A4 900000   F   263          MOV    DPTR,#ISTHRLOW
00A7 E500     F   264          MOV    A,TEMP0                ;NOW CALCULATE THE LOW THRESHOLD SEETPOINT VALUE
00A9 C3           265          CLR    C
00AA 9E           266          SUBB   A,R6                   ;LOW THRESHOLD=(IAVERAGE-OFFSET)
00AB F0           267          MOVX   @DPTR,A
00AC A3           268          INC    DPTR
00AD E500     F   269          MOV    A,TEMP1
00AF 9F           270          SUBB   A,R7
00B0 F0           271          MOVX   @DPTR,A
00B1 22           272          RET
                  273  ;
                  274  ;********************************************************************
                  275  ;********************************************************************
                  276  ;THIS ROUTINE TAKES A TWO BYTE SAMPLE OF MOTOR CURRENT POINTED TO BY
                  277  ;THE DATA POINTER (DPTR) AND COMPARES IT TO THE HIGH AND LOW THRESHOLDS
                  278  ;STORED IN TEMPORARY REGISTERS "TEMP2" TO "TEMP5" TO DETERMINE THE
                  279  ;POLARITY IF ANY OF THE CHANGE IN MOTOR CURRENT. IT THEN LOOKS TO SEE
                  280  ;IF THE POLARITY OF THE CHANGE ALSO CHANGED. ON A POLARITY REVERSAL
                  281  ;A COUNTER IS INCREMENTED.
                  282  ;********************************************************************
                  283  ;
00B2 E0           284  SCHECK: MOVX   A,@DPTR                ;GET NEXT SAMPLE OF MOTOR CURRENT
00B3 C3           285          CLR    C
00B4 F8           286          MOV    R0,A                   ;SAVE LOW BYTE OF SAMPLE
00B5 9500     F   287          SUBB   A,TEMP2                ;SUBTRACT LOW THRESHOLD VALUE
00B7 A3           288          INC    DPTR
00B8 E0           289          MOVX   A,@DPTR
00B9 F9           290          MOV    R1,A                   ;SAVE HIGH BYTE OF SAMPLLE
00BA 9500     F   291          SUBB   A,TEMP3
00BC 5004         292          JNC    LOWOK
00BE 7AFF         293          MOV    R2,#0FFH               ;CHANGE WAS NEGATIVE
00C0 800B         294          SJMP   CHECKD
00C2 E8           295  LOWOK:  MOV    A,R0                   ;RESTORE VALUE OF SAMPLE
00C3 C3           296          CLR    C
00C4 9500     F   297          SUBB   A,TEMP4
00C6 E9           298          MOV    A,R1
00C7 9500     F   299          SUBB   A,TEMP5
00C9 4002         300          JC     CHECKD
00CB 7A00         301          MOV    R2,#0                  ;POLARITY CHANGE WAS POSITIVE
00CD EA           302  CHECKD: MOV    A,R2
00CE B50002   F   303          CJNE   A,TEMP1,COMPLT
00D1 1500     F   304          DEC    TEMP0
00D3 0500     F   305  COMPLT: INC    TEMP0                  ;INCREMENT POLARITY COUNT IF POLARITY CHANGED
00D5 8A00     F   306          MOV    TEMP1,R2
00D7 22           307          RET
                  308  ;
                  309  ;********************************************************************
                  310  ;********************************************************************
```

```
                311     ;THIS IS A 3 BYTE BY 2 BYTE MULTIPLY ROUTINE WHERE
                312     ;(R3,R4,R5,R6,R7)=(A,R1)*(R5,R6,R7)
                313     ;MULTIPLICATION IS DONE USING SUM OF PARTIAL PRODUCTS IN THIS ORDER
                314     ;
                315     ;(A,R1)*(R5,R6,R7)=(A*R5)+(R0*R5*2**8)+(A*R6*2**8)+(R0*R6*2**16)
                316     ;                 +(A*R7*2**16)+(R0*R7*2**24)
                317     ;
                318     ;                         NN CYCLES
                319     ;
                320     MULT3X2:
00D8  F9        321             MOV     R1,A            ;SAVE A IN R1
00D9  8DF0      322             MOV     B,R5
00DB  A4        323             MUL     AB              ;FIRST PP (PARTIAL PRODUCT)
00DC  FB        324             MOV     R3,A
00DD  ACF0      325             MOV     R4,B
                326     ;
00DF  E8        327             MOV     A,R0
00E0  8DF0      328             MOV     B,R5
00E2  A4        329             MUL     AB              ;SECOND PP
00E3  2C        330             ADD     A,R4
00E4  FC        331             MOV     R4,A
00E5  E4        332             CLR     A
00E6  35F0      333             ADDC    A,B
00E8  FD        334             MOV     R5,A
                335     ;
00E9  E9        336             MOV     A,R1
00EA  8EF0      337             MOV     B,R6
00EC  A4        338             MUL     AB              ;THIRD PP
00ED  2C        339             ADD     A,R4
00EE  FC        340             MOV     R4,A
00EF  E4        341             CLR     A
00F0  35F0      342             ADDC    A,B
00F2  FD        343             MOV     R5,A
                344     ;
00F3  E8        345             MOV     A,R0
00F4  8EF0      346             MOV     B,R6
00F6  A4        347             MUL     AB              ;FORTH PP
00F7  2D        348             ADD     A,R5
00F8  FD        349             MOV     R5,A
00F9  E4        350             CLR     A
00FA  35F0      351             ADDC    A,B
00FC  FE        352             MOV     R6,A
                353     ;
00FD  E9        354             MOV     A,R1
00FE  8FF0      355             MOV     B,R7
0100  A4        356             MUL     AB              ;FIFTH PP
0101  2D        357             ADD     A,R5
0102  FD        358             MOV     R5,A
0103  E4        359             CLR     A
0104  35F0      360             ADDC    A,B
0106  FE        361             MOV     R6,A
                362     ;
0107  E8        363             MOV     A,R0
0108  8FF0      364             MOV     B,R7
010A  A4        365             MUL     AB              ;LAST PP
010B  2E        366             ADD     A,R6
010C  FE        367             MOV     R6,A
010D  E4        368             CLR     A
010E  35F0      369             ADDC    A,B
0110  FF        370             MOV     R7,A
                371     ;
0111  22        372             RET
                373     ;
                374     END
```

We claim:

1. In a compressor system including a compressor driven by an electric motor, a surge detection system comprising the following combination:

means for sensing the motor current to derive a current representative signal;

means responsive to said current representative signal for sampling over a sliding window a plurality of successive and consecutive samples thereof;

means for deriving one sample at a time as an instantaneous representation of the motor current magnitude;

means responsive to said plurality of samples for continuously deriving therefrom and through successive windows a signal representative of the average thereof;

comparator means responsive to a threshold signal and to said sample average for detecting a polarity signal representative of an excess in magnitude above and below said sample average;

means responsive to said polarity signal and to said one sample for detecting the occurrence of successive polarity changes in said polarity signal as an indication of an impeding surge; and means for generating a surge indicative signal to be applied to the compressor system when said polarity changes have lasted during a predetermined time period.

2. The surge detection system of claim 1 wherein said one sample is derived after a time delay following the derivation of said average representative signal.

3. The surge detection system of claim 2 with said predetermined time period being equal to the duration of said sliding window.

4. The surge detection system of claim 3 wherein said sliding window contains N successive and consecutive samples, said one sample being derived upon every shift of said sliding window from one number N of samples to a subsequent number N of samples therein, and wherein said average representative signal is derived in relation to each of said successive N samples.

* * * * *